(12) United States Patent
Dinu (10) Patent No.: US 9,822,969 B2
(45) Date of Patent: Nov. 21, 2017

(54) FUEL INJECTOR HAVING TIP COOLING

(75) Inventor: Constantin Dinu, Katy, TX (US)

(73) Assignee: General Electric Company, Schenectady, NY (US)

(*) Notice: Subject to any disclaimer, the term of this patent is extended or adjusted under 35 U.S.C. 154(b) by 1211 days.

(21) Appl. No.: 12/957,232

(22) Filed: Nov. 30, 2010

(65) Prior Publication Data

US 2012/0132725 A1    May 31, 2012

(51) Int. Cl.
| | | |
|---|---|---|
| *F23D 11/38* | (2006.01) | |
| *F23D 1/00* | (2006.01) | |
| *C10J 3/50* | (2006.01) | |

(52) U.S. Cl.
CPC ............ *F23D 11/38* (2013.01); *C10J 3/506* (2013.01); *F23D 1/005* (2013.01); *C10J 2200/152* (2013.01); *C10J 2300/0959* (2013.01); *C10J 2300/0976* (2013.01); *C10J 2300/1653* (2013.01); *C10J 2300/1678* (2013.01); *F23D 2214/00* (2013.01); *F23D 2900/00006* (2013.01); *Y02E 20/16* (2013.01); *Y02E 20/18* (2013.01)

(58) Field of Classification Search
CPC ...... F23D 11/38; F23D 1/005; F23D 2214/00; F23D 2900/00006; Y02E 20/18; Y02E 20/16; C10J 2300/0959; C10J 2300/0976; C10J 2300/1653; C10J 2300/1678; C10J 2200/152; C10J 3/506
USPC ..................................... 239/132, 132.1–132.5
See application file for complete search history.

(56) References Cited

U.S. PATENT DOCUMENTS

| | | | | |
|---|---|---|---|---|
| 3,874,592 | A * | 4/1975 | Buschmann et al. ...... | 239/132.3 |
| 4,417,721 | A | 11/1983 | Pehlke et al. | |
| 4,736,693 | A | 4/1988 | Clomburg, Jr. | |
| 4,890,794 | A * | 1/1990 | Imafuku ............ | F02M 51/0678 |
| | | | | 239/533.12 |
| 6,010,330 | A * | 1/2000 | Helton et al. .................. | 431/160 |
| 8,360,342 | B2 * | 1/2013 | Mishra ........................ | 239/132.3 |
| 2004/0099243 | A1 * | 5/2004 | Dantes ............... | F02M 51/0685 |
| | | | | 123/294 |

FOREIGN PATENT DOCUMENTS

| | | |
|---|---|---|
| CN | 1035172 A | 8/1989 |
| CN | 1246141 A | 3/2000 |
| CN | 1311712 A | 9/2001 |
| CN | 101503636 A | 8/2009 |
| CN | 101821365 A | 9/2010 |

OTHER PUBLICATIONS

Chinese Office Action; Application No. CN201110403216.9; dated Oct. 15, 2014; 6 pages.

* cited by examiner

*Primary Examiner* — Christopher Kim
(74) *Attorney, Agent, or Firm* — Fletcher Yoder, P.C.

(57) ABSTRACT

According to various embodiments, a system includes a gasification fuel injector. The gasification fuel injector includes a tip portion, an annular coolant chamber disposed in the tip portion, a recessed surface for cooling control and a first structural support extending through the annular coolant chamber. The first structural support divides the annular coolant chamber into a first passage and a second passage.

18 Claims, 6 Drawing Sheets

FUEL INJECTOR HAVING TIP COOLING

BACKGROUND OF THE INVENTION

The subject matter disclosed herein relates to fuel injectors, and, more particularly, to fuel injectors for gasifiers.

A variety of systems employ fuel injectors to inject a fuel into a reaction chamber or a combustion chamber. For example, an integrated gasification combined cycle (IGCC) power plant includes a gasifier with one or more fuel injectors. The fuel injectors supply a fuel, such as an organic feedstock, into the gasifier along with oxygen and steam to generate a syngas. In general, a reaction or combustion occurs downstream from the fuel injectors. However, the proximity of a flame and/or heat from the reaction can damage and/or reduce the life of the fuel injectors, particularly if the fuel injectors exceed certain temperatures. For example, the fuel injector may be subject to greater temperatures toward the tip and/or other locations close to the reaction. Unfortunately, existing cooling techniques are unable to provide sufficient cooling of the fuel injector, and thus, the hot spots may not be sufficiently cooled to avoid premature fuel injector degradation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification fuel injector, including an annular tip portion disposed about an injection flow path, an annular coolant chamber disposed in the annular tip portion, and an annular recess disposed along a downstream surface of the annular tip portion.

In a second embodiment, a system includes, a fuel injector, including, a fuel passage configured to inject a fuel, a first oxygen passage configured to inject oxygen, a tip portion disposed about the fuel passage and the first oxygen passage, a coolant chamber disposed in the tip portion, and a curved recess disposed along a downstream surface of the tip portion.

In a third embodiment, a system includes a gasification fuel injector, including, a first passage configured to inject a first flow of fuel, a second passage configured to inject a second flow of oxygen, a third passage configured to inject a third flow, wherein the first, second, and third passages are concentric with one another, an annular tip portion, a coolant passage extending through the annular tip portion, and an annular recess disposed along a downstream surface of the annular tip portion, wherein the annular recess curves inwardly into the downstream surface.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A variety of systems may utilize fuel injectors to inject fuel including dry fuel, slurry fuel, and optionally other fluids, into a reaction chamber or a combustion chamber. For example, an IGCC power plant may have a gasifier that includes one or more gasification fuel injectors. A reaction (e.g., partial combustion) occurs near a tip of the fuel injector, and thus the tip may be exposed to temperatures up to approximately 1,300 degrees Celsius (C). In addition, hot gases may recirculate back toward the fuel injector. Such high temperatures may cause damage to the fuel injector even though the injector is made from materials specifically designed for high temperatures. Accordingly, different cooling methods may be used to increase the life of fuel injectors. For example, fuel injector tips may have an integral coolant chamber to flow a coolant. In addition, a cooling coil may surround the body of the fuel injector to carry coolant to the coolant chamber. However, when such methods are used without the disclosed tip cooling techniques, an outer surface of the fuel injector may be exposed to hot recirculated gases, while an inner surface of the fuel injector may be in contact with the coolant. For example, the temperature of the coolant may be approximately 40 degrees C., resulting in a temperature difference of approximately 1,260 degrees C. Such a large temperature gradient may allow the possibility of stress cracks near the tip of the fuel injector. Specifically, the high temperatures and temperature fluctuations may cause radial cracks near the tip. In addition, high strain forces caused by the high temperature gradient may cause circumferential cracks. Thicker coolant chamber walls designed for strength may inhibit heat transfer, contributing to larger temperature gradients. Such cracks may reduce the life of the fuel injector.

The embodiments described below address these issues through tip cooling. Tip cooling extends the life of the feed injector by reducing the temperature gradient between the coolant and/or the oxygen flow and the reactions in the gasifier. In particular, smaller temperature differences in the tip material limit thermal stress cracking in the feed injector tip. In some embodiments, a curved recess (e.g., an annular recess) in the injector tip decreases the distance between the coolant chamber and the injector tip face, which may reduce the temperature differences in the tip material. In other embodiments, a recess in the injector tip may decrease the distance between the oxygen flow path and the injector tip face again reducing the temperature differences in the tip material. In still other embodiments, a recess in the injector tip may separate the maximum thermal stress point from the maximum mechanical stress point and vice versa. In other embodiments, the recess may be filled with sacrificial material or filling material that limits heat transfer, particularly during transient conditions (e.g., startup) involving extreme temperatures.

Figure 1:
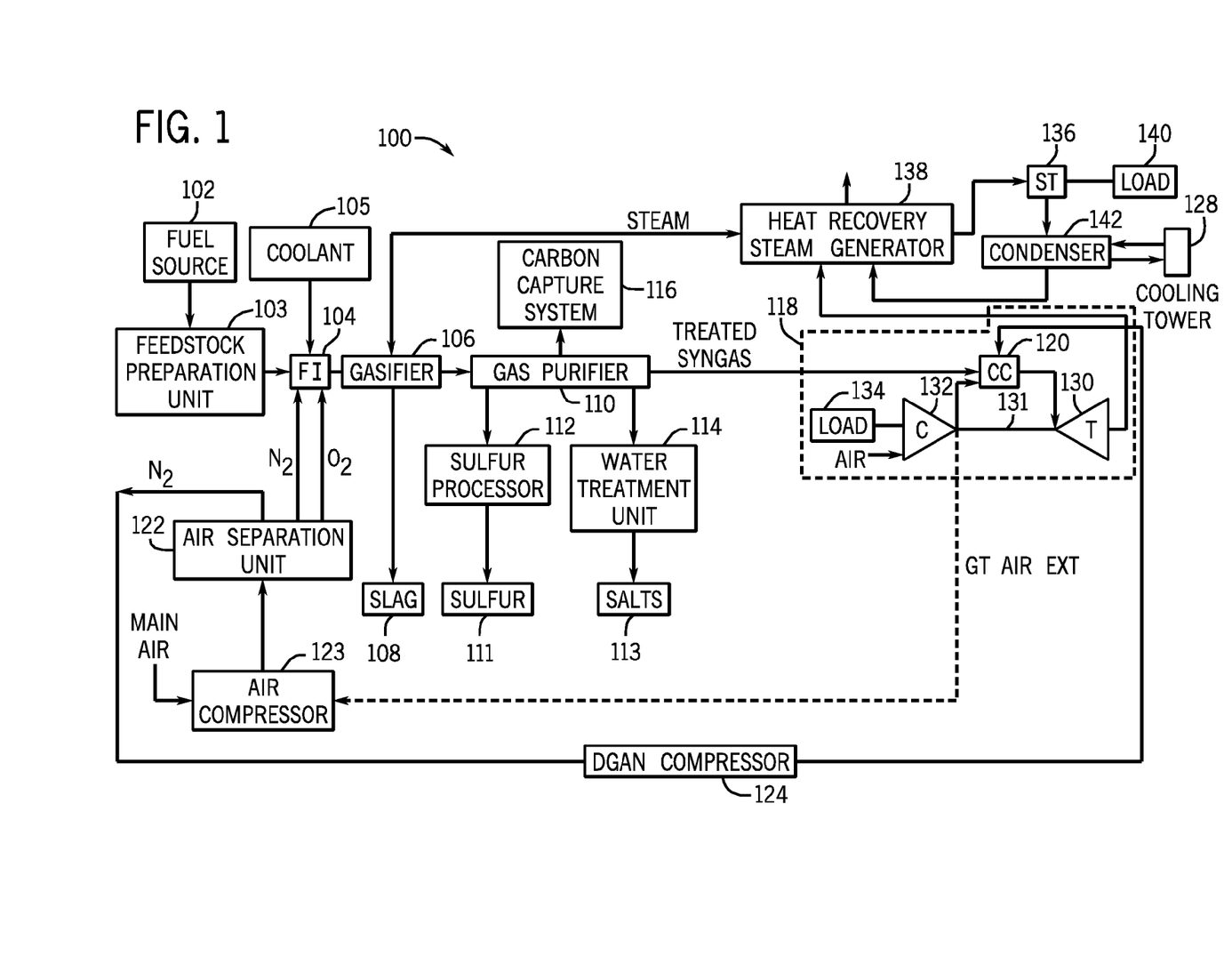
FIG. 1 is a block diagram of an embodiment of an IGCC power plant incorporating a fuel injector with tip cooling.

Turning now to the drawings, FIG. 1 is a diagram of an embodiment of an IGCC system 100 that may produce and burn a synthetic gas, i.e., syngas. Other elements of the IGCC system 100 may include a fuel source 102, which may be a solid or a liquid, that may be utilized as a source of energy for the IGCC system. The fuel source 102 may include coal, petroleum coke, oil, biomass, wood-based materials, agricultural wastes, tars, coke oven gas and asphalt, or other carbon containing items.

The fuel of the fuel source 102 may be passed to a feedstock preparation unit 103. The feedstock preparation unit 103 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 103 to create slurry feedstock. In other embodiments, no liquid is added to the fuel source, thus yielding dry feedstock. In further embodiments, the feedstock preparation unit 103 may be omitted if the fuel source 102 is a liquid.

Next, the feedstock may be passed to a fuel injector 104 coupled to a gasifier 106. As appreciated, the gasifier 106 is one example of a combustion chamber that may use the fuel injector 104 having tip cooling as discussed in detail below. In certain embodiments, the fuel injector 104 combines the various feed streams to the gasifier 106 in such a manner as to promote efficient combustion. In addition, a coolant 105, described in more detail below, may be directed to the fuel injector 104 to provide cooling and extend the life of the fuel injector. Specifically, the gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees C. to 1600 degrees C., depending on the type of gasifier 106 utilized. The gasification process may include the feedstock undergoing a pyrolysis process, whereby the feedstock is heated. Temperatures inside the gasifier 106 may range from approximately 150 degrees C. to 700 degrees C. during the pyrolysis process, depending on the fuel source 102 utilized to generate the feedstock. The heating of the feedstock during the pyrolysis process may generate a solid (e.g., char) and residue gases (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees C. to 1600 degrees C. Next, steam may be introduced into the gasifier 106 during a gasification step. The char may react with the carbon dioxide and steam to produce carbon monoxide and hydrogen at temperatures ranging from approximately 800 degrees C. to 1100 degrees C. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, the gasifier 106 manufactures a resultant gas. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 106 may also generate waste, such as slag 108, which may be a wet ash material. This slag 108 may be removed from the gasifier 106 and disposed of, for example, as road base or as another building material. To clean the untreated syngas, a gas purifier 110 may be utilized. In one embodiment, the gas purifier 110 may be a water gas shift reactor. The gas purifier 110 may scrub the untreated syngas to remove the HCl, HF, COS, HCN, and $H_2S$ from the untreated syngas, which may include separation of sulfur 111 in a sulfur processor 112 by, for example, an acid gas removal process in the sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas may include approximately 3% CO, approximately 55% $H_2$, and approximately 40% $CO_2$ and is substantially stripped of $H_2S$.

In some embodiments, a carbon capture system 116 may remove and process the carbonaceous gas (e.g., carbon dioxide that is approximately 80-100 or 90-100 percent pure by volume) included in the syngas. The carbon capture system 116 also may include a compressor, a purifier, a pipeline that supplies $CO_2$ for sequestration or enhanced oil recovery, a $CO_2$ storage tank, or any combination thereof. The captured carbon dioxide may be transferred to a carbon dioxide expander, which decreases the temperature of the carbon dioxide (e.g., approximately 5-100 degrees C., or about 20-30 degrees C.), thus enabling the carbon dioxide to be used as a suitable cooling agent for the system. The cooled carbon dioxide (e.g., approximately 20-40 degrees C., or about 30 degrees C.) may be circulated through the system to meet its refrigeration needs or expanded through subsequent stages for even lower temperatures. Carbon dioxide may also be used as the coolant 105 for the fuel injector 104. The treated syngas, which has undergone the removal of its sulfur containing components and a large fraction of its carbon dioxide, may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the fuel injector 104. Additionally, the ASU 122 may transmit separated nitrogen to the fuel injector 104 (e.g., as coolant 105) or a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Water from the cooling tower 128 may also be used as coolant 105 for the fuel injector 104. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106 or to the fuel injector 104 as coolant 105. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
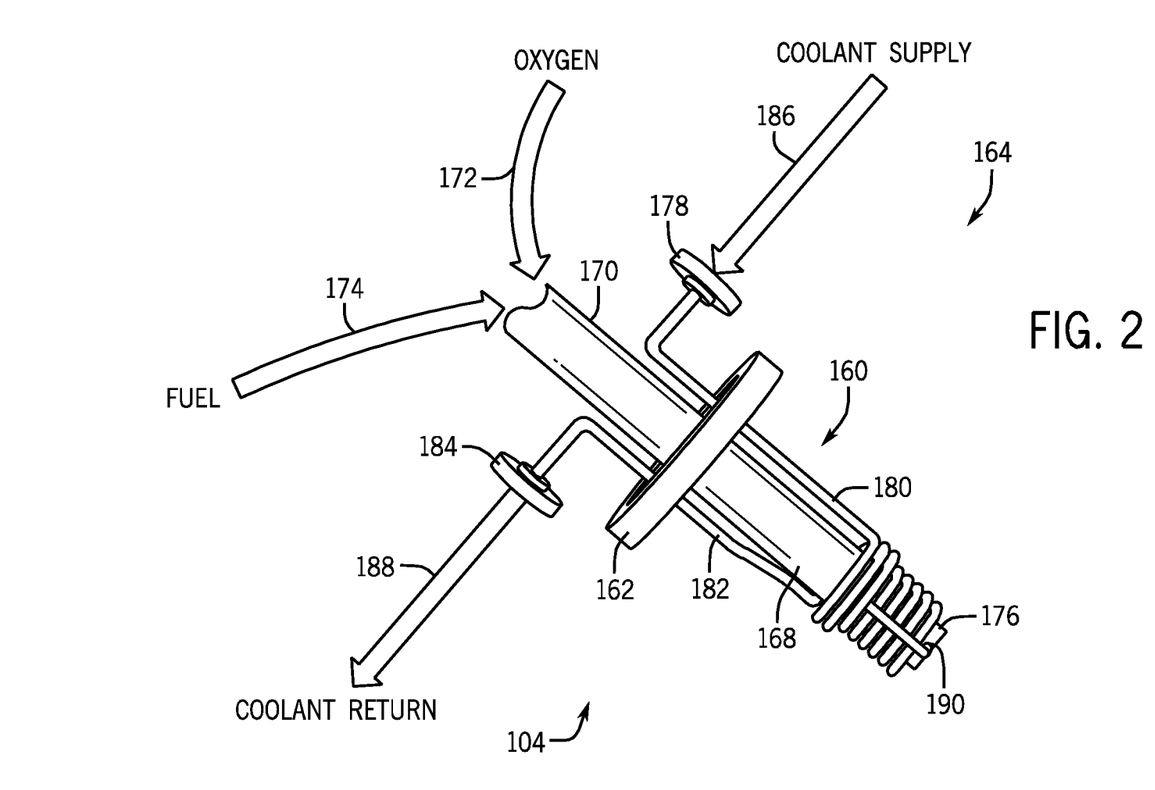
FIG. 2 is a perspective view of an embodiment of a fuel injector having tip cooling.

FIG. 2 is a perspective view of an embodiment of a fuel injector 104 having tip cooling. The fuel injector 104 includes an injection pipe 160, a gasifier connection flange 162, and a cooling system 164. The fuel injector 104 delivers reactants to the gasifier 106 through the injection pipe 160. As illustrated the flange 162 surrounds the pipe 160 and allows connection of the pipe 160 to the gasifier 106. This keeps the reactants within the gasifier 106 and maintains the fuel injector 104 in proper position during use. The injection pipe 160 defines a first section 168 and a second section 170. The first section 168 sits inside of the gasifier 106 while the second section 170 remains exterior to the gasifier 106. As illustrated, the second section 170 receives oxygen 172 and fuel 174, for combustion in the gasifier 106, and routes it to the first section 168. The first section 168 then routes the oxygen 172 and fuel 174 through the injector tip 176 and into the gasifier 106. The combustion of the oxygen 172 and fuel 174 may produce temperatures high enough to damage the injector 104 without sufficient cooling.

As illustrated, the fuel injector 104 includes the cooling system 164 to thermally protect the fuel injectors 104, and in particular the injector tip 176. In particular, the cooling system 164 reduces the temperatures experienced at the injector tip 176. As the injector tip 176 is nearest to the gasifier reactions, it is the most susceptible to thermal stresses that may cause material fatigue. The injector tip 176 is cooled by cooling system 164, which includes a coolant supply port 178, a coolant supply pipe 180, a coolant exit pipe 182, a coolant exit port 184, a coolant supply 186, and a coolant return 188. The coolant (e.g., water) for cooling the injector tip 176 comes from the coolant supply 186 and enters the coolant supply port 178. The coolant supply port 178 connects to the supply pipe 180 that channels the coolant through the flange 162. After passing through the flange 162, the coolant supply pipe 180 carries the coolant to an injector tip entrance port 190, wherein the coolant enters a coolant passage in the injector tip 176. After circulating through the coolant passage in the injector tip 176, the coolant exits through a feed injector tip exit port and into the coolant exit pipe 182. The coolant exit pipe 182 then routes the coolant through the flange 162 and to the coolant exit port 182. After passing through the coolant exit port 182, the coolant enters the coolant return 188. The warm coolant may then pass through a heat exchanger before returning to the coolant supply 186. The heat exchanger may transfer heat from the coolant to another medium, such as air, water, or refrigerant, thereby cooling the coolant.

The coolant reduces the temperatures experienced at injector tip 176, which extends the life of the fuel injector 104. In some embodiments, the coolant supply pipe 180 and the coolant exit pipe 182 may wrap around the injection pipe 160 near the injector tip 176. This may assist in cooling the injector tip 176 and first section 168. In still other embodiments, the pipes 180 and 182 may wrap around the entire second section 168. In addition, the pipes may be fabricated from materials specifically designed for high temperatures, such as, but not limited to, austenitic nickel-chromium-based superalloys and cobalt-chromium-iron heat-resistant alloys.

Figure 3:
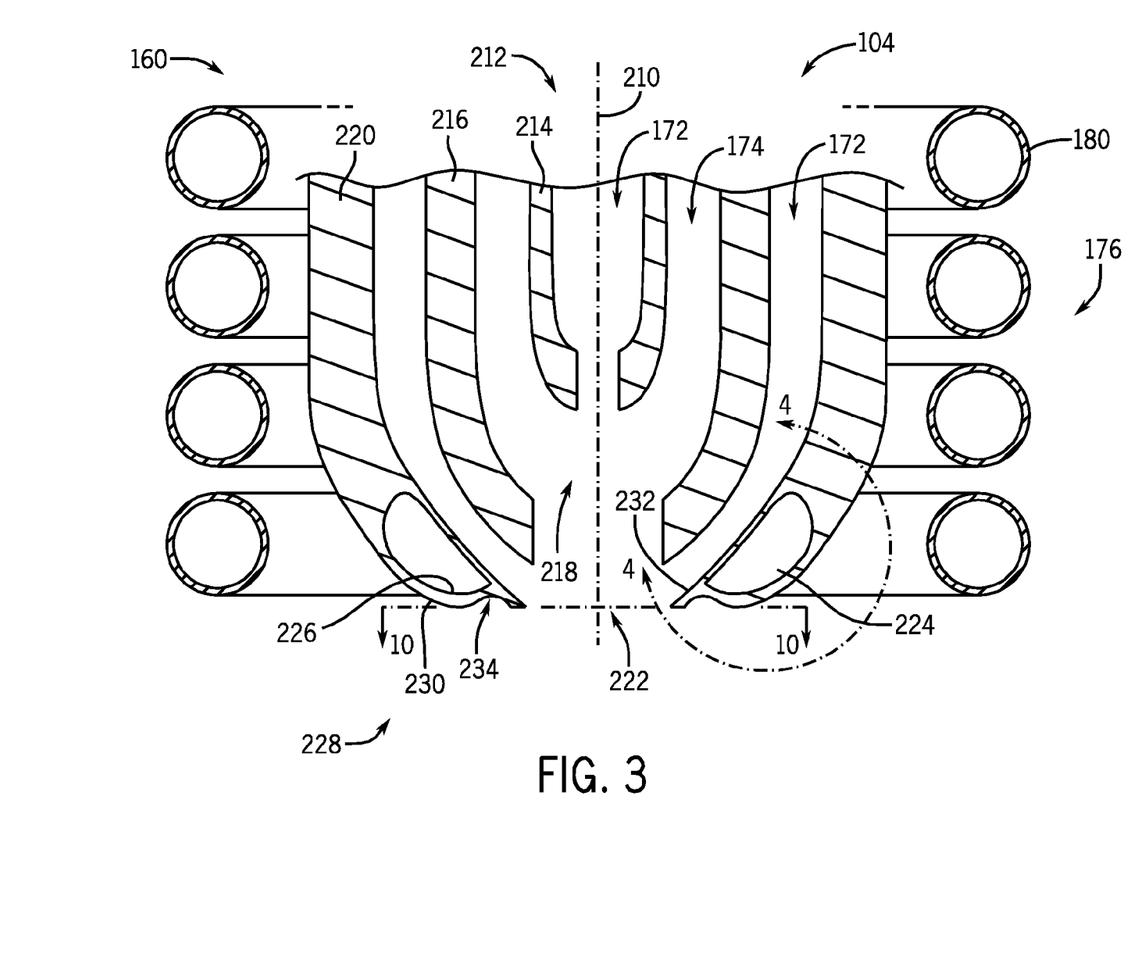
FIG. 3 is a partial axial cross-section of an embodiment of a fuel injector having tip cooling.

FIG. 3 is a partial axial cross-section of an embodiment of the fuel injector 104 having tip cooling. An axial axis 210 passes lengthwise through the center of the fuel injector 104. The fuel injector 104 has an upstream side 212, from which the fuel feedstock 174, oxygen 172, and other materials may originate. The fuel injector 104 also has the tip 176, where the feedstock 174, oxygen 172, and other materials may exit. Thus, the tip 176 is an outlet for the materials. Turning next to the passages of the fuel injector 104, although one arrangement of passages will be described, other arrangements are possible depending on the requirements of a particular combustion system. Specifically, the innermost material passing through the fuel injector 104 is oxygen 172, which is directed to the tip 176 by a first oxygen passage 214 (e.g., central oxygen passage). The first oxygen passage 214 supplies oxygen 172 for combustion downstream of the tip 176 of the fuel injector 104. Oxygen 172 may include, but is not limited to, pure oxygen, oxygen mixtures, and air. The next outermost material is a fuel 174, which is directed to the tip 176 by a fuel passage 216 (e.g., annular fuel passage). Thus, the fuel passage 216 surrounds the first oxygen passage 214 in a coaxial or concentric arrangement. The fuel 174 may include a dry fuel, a slurry fuel, a liquid fuel, or any combination thereof. The fuel passage 216 directs the fuel 174 downstream of oxygen 172 from the first oxygen passage 214 to enhance the mixing of the fuel and oxygen. The region where the oxygen 172 from the first oxygen passage 214 and the fuel 174 combine may be referred to as a pre-mix zone 218. The next outermost material is oxygen 172, which is directed to the tip 176 of the fuel injector 104 by a second oxygen passage 220 (e.g., annular oxygen passage). Thus, the second oxygen passage 220 surrounds the fuel passage 216 in a coaxial or concentric arrangement. The second oxygen passage 220 may direct oxygen 172 to the mixture of the fuel 174 and oxygen 172 from the first oxygen passage 214 to produce a fine spray that exits through aperture 222. The oxygen 172 from the second oxygen passage 220 may also include, but is not limited to, pure oxygen, oxygen mixtures, and air.

Disposed in the tip 176 of the fuel injector 104 is an annular coolant chamber 224. Although the coolant chamber 224 is shown near the tip of the second oxygen passage 220 in this embodiment, the coolant chamber may extend toward the upstream side 212. In addition, the cross-section of the coolant chamber 224 may have the particular shape shown in FIG. 3, or be configured in other suitable shapes, such as squares, ovals, triangles, rectangles, or other regular or irregular shapes.

As explained above, coolant from the coolant supply 186 travels through the coolant supply pipe 180 and circulates around the injection pipe 160 until it enters the coolant chamber 224. Examples of coolants may include, but are not limited to, water, steam, carbon dioxide, and nitrogen. However, the coolant may include any suitable coolant gas, coolant liquid, coolant mixture, or any combination thereof. As each of these materials has different heat transfer characteristics, a particular coolant may be selected depending on the particular requirements of the fuel injector 104. As the coolant passes through the coolant chamber 224, the coolant contacts a coolant chamber surface 226 facing the reaction zone downstream of the injector 104. As the tip 176 is exposed to hot gases, the coolant transfers heat away from tip 176, and the coolant carries the heat away to the coolant return 188. By absorbing the heat from the hot combustion gases and carrying it away from the fuel injector 104, the coolant chamber 224 helps to protect the tip 176 from the high temperatures in the gasifier 106.

In addition to the coolant chamber 224, the injection tip 176 defines an annular tip portion 228 with an exterior surface 230 and an oxygen passage surface 232. The exterior surface 230 may further define an annular recess 234 (e.g., curved annular recess) formed in the exterior surface 230. The annular recess 234 may reduce the temperature difference between the exterior surface 230 and the coolant chamber surface 226, and the temperature difference between the exterior surface 230 and the oxygen passage surface 232. The greater the temperature differences between these surfaces the greater the thermal stress on the material in the tip portion 226. Over time, the continuous thermal stress may cause cracking in the tip portion 226 without the annular recess 234. For example, cracks may form and increase until coolant is able to escape from the coolant chamber 224. Accordingly, the annular recess 234 is configured to reduce the thermal differential in the annular tip portion 228, by shifting the point of maximum mechanical stress in a mechanical stress distribution from the point of maximum thermal stress in a thermal stress distribution, and generally reduce the potential for thermal stress cracks in the tip portion 228.

Figure 4:
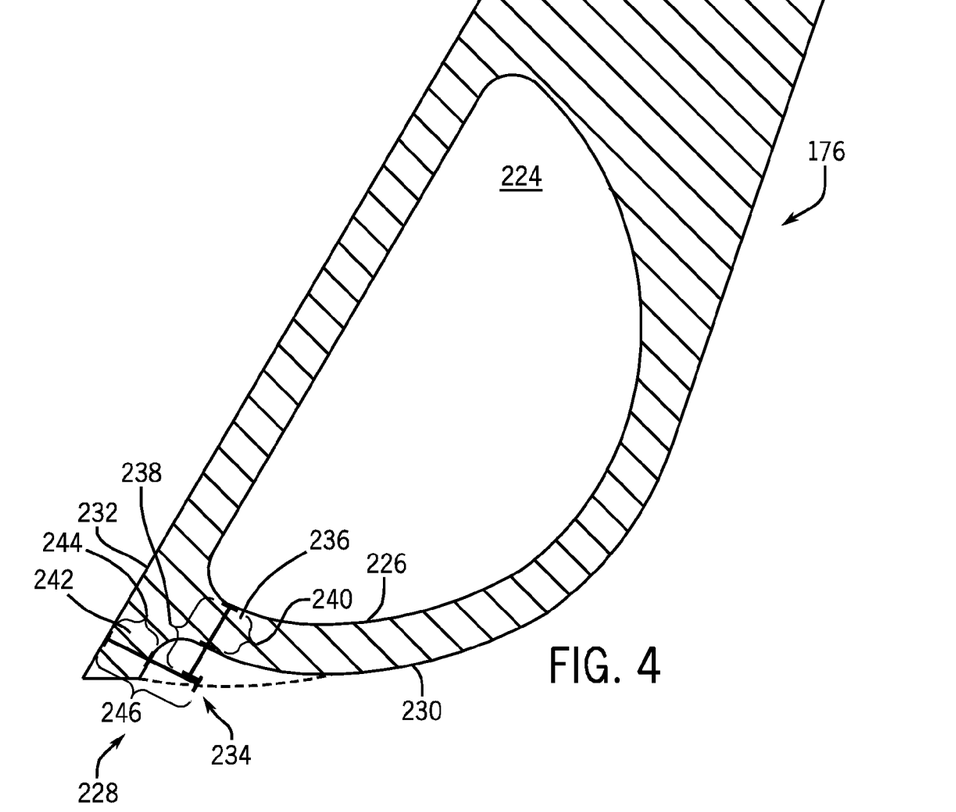
FIG. 4 is a partial cross-sectional view of an embodiment of the injector tip in FIG. 3 taken within line 4-4.

FIG. 4 is a partial cross-sectional view of an embodiment of the injector tip 176 in FIG. 3 taken within line 4-4. As explained above, the injector tip 176 includes the tip portion 228 with the annular recess 234 disposed along the exterior surface 230. During gasification, the tip portion 228 may experience harsh temperature conditions. For example, the interior of a gasifier may reach 1300 degrees Celsius. For this reason, the injector 104 includes the coolant chamber 224 for coolant circulation in the injector tip 176. The circulation of coolant in the tip 176 reduces the temperature of the tip 176, and thus, extends its life. However, with the circulation of coolant in the tip 176, a high temperature difference may develop in a wall 236 between the exterior surface 230 and the coolant chamber surface 226. As an example, the exterior surface 230 may have a temperature of 1000 degrees C. while the coolant chamber surface 226 may have a temperature of 40 degrees C. The difference in the two surface temperatures may cause considerable thermal stress in the material of the wall 236, as cooler material portions contract and hotter material portions expand. In particular, the more material in wall 236 between the coolant chamber surface 226 and the exterior surface 230 the more difficult it is for the coolant in chamber 224 to reduce the overall temperature difference. To reduce the temperature differences between the two surfaces 226 and 230 the tip portion 228 may form the annular recess 234. In particular, the recess 234 may change the thickness of wall 236 from a distance 238 to a distance 240. The reduction in thickness decreases the amount of material in the tip portion 228. The reduction in thickness increases the ability of the coolant to cool the tip portion 228, which reduces the overall temperature difference that otherwise creates thermal stress and eventually cracking (i.e., failure of the injector 104).

The recess 234 may also improve the temperature difference between the oxygen passage surface 232 and the exterior surface 230, i.e., wall 242. As explained above, oxygen passes through the tip 176 and into the gasifier 106. As the oxygen 172 flows along the oxygen passage surface 232, the oxygen 172 convectively cools the tip portion 228. Without the recess 234, the wall 242 would be thicker, i.e., more material for the oxygen flow to cool, which may increase the thermal stress. As illustrated, the distance 244 between the surface 232 and surface 230 with the recess 234 is considerably less than the distance 246 without the recess 234. The reduction in distance from 246 to 244 improves the oxygen flow's ability to remove energy and reduce the temperature differences in the tip portion 228. Furthermore, and as illustrated, the distances 240 and 244 are equal or nearly equal. As will be discussed in detail below, the distances 240 and 244 may not always be equal or nearly equal. For example, the recess 234 may be sized and positioned to provide equal or unequal distances 240 and 244 (e.g., thicknesses) of the walls 236 and 242, thereby controlling the cooling and thermal gradient in these walls. In the illustrated embodiment, the recess 234 has a curved cross-section (e.g., U-shape) extending circumferentially about the axis 210. In other words, the recess 234 curves inwardly into the surface 230 to control the distances 240 and 244, thereby controlling the temperature distribution and stresses.

Figure 5:
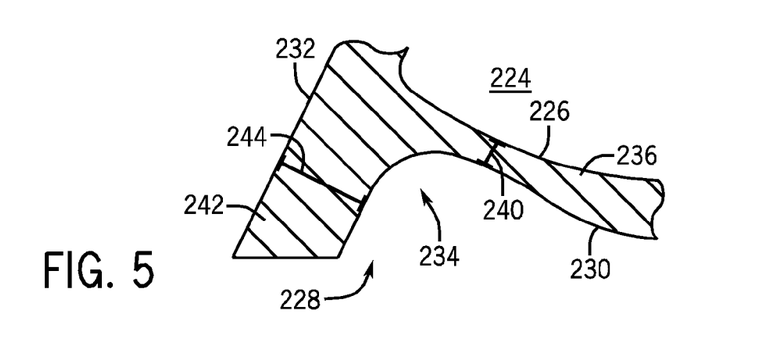
FIG. 5 is a partial cross-sectional view of an embodiment of the injector tip of FIG. 4.

FIG. 5 is a partial cross-sectional view of an embodiment of the injector tip portion 228 of FIG. 4. In FIG. 5, the recess 234 changes the distances 240 and 244 (i.e., thickness of walls 236, 242) from that in FIG. 4. As illustrated, wall 236 is considerably thinner than wall 242. The decrease in distance 240 and the increase in distance 244 may be useful in embodiments with low coolant flow rates and high oxygen flow rates. For example, a particular gasifier 106 may require a significant oxygen flow or a high-speed oxygen flow. Thus, an increased oxygen flow rate may produce the desired thermal gradient between the oxygen flow surface 232 and the exterior surface 230, which enables a thicker wall 242. In contrast, the decrease in distance 240 between the exterior surface 230 and the coolant chamber surface 226 may result in the appropriate thermal stress levels even with a low coolant flow rate. In other words, the distances 240 and 244 may be varied to provide a more uniform temperature distribution in the tip portion 228 based on the cooling along surfaces 226 and 232 and the heat along surface 230.

Figure 6:
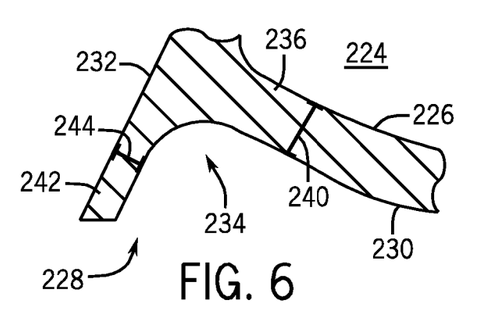
FIG. 6 is a partial cross-sectional view of an embodiment of the injector tip of FIG. 4.

FIG. 6 is a partial cross-sectional view of an embodiment of the injector tip portion 228 of FIG. 4. In FIG. 6, the recess 234 again changes the thickness of walls 236 and 242. As illustrated, the wall 236 is considerably thicker than wall 242. The increase in distance 240 and decrease in distance 244 may be useful in embodiments with high coolant flow rates and low oxygen flow rates. For example, a particular gasifier 106 may have low flow oxygen requirements. Thus, by decreasing the thickness of wall 242, the low oxygen flow rate may still limit thermal stress between the oxygen flow surface 232 and the exterior surface 230. In contrast, an increase in the coolant flow rate may permit an increase in the thickness of wall 236, while maintaining appropriate thermal stress levels.

Figure 7:
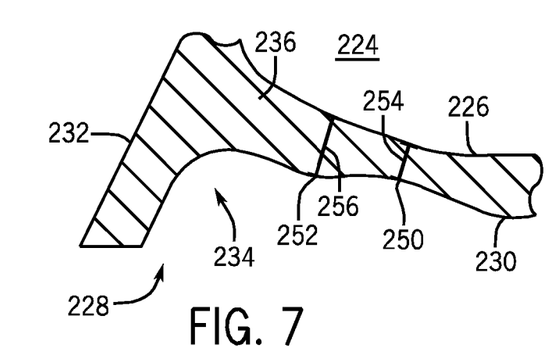
FIG. 7 is a partial cross-sectional view of an embodiment of the injector tip of FIG. 4.

FIG. 7 is a partial cross-sectional view of an embodiment of the injector tip portion 228 of FIG. 4. Without the recess 234, the maximum mechanical stress point may be at the same position as the maximum thermal stress point. The convergence of multiple stresses at a single location may accelerate failure of the injection tip 176. Accordingly, the recess 234 may be shaped and partitioned to separate the maximum mechanical stress point from the maximum thermal stress point. In the present embodiment, the maximum mechanical stress point 250 is different from the maximum thermal stress point 252. In particular, the recess 234 geometry separates the points 250, 252 by varying the thickness of wall 236 (i.e., the wall may decrease in thickness between point 252 and point 250). As illustrated, the distance 254 between the exterior face 230 and the coolant chamber surface 226 at the maximum mechanical stress point 250 is less than distance 256 at the maximum thermal stress location 252. Accordingly, the temperature differences between the surfaces 226 and 230 at point 250 will be less than that at point 252. In other words, because of the smaller temperatures differences around point 250, it will experience less thermal stress than point 252. Thus, the shape of recess 234 may shift the maximum thermal stress point 252 away from the maximum mechanical stress point, which may increase the life of injector 104.

Figure 8:
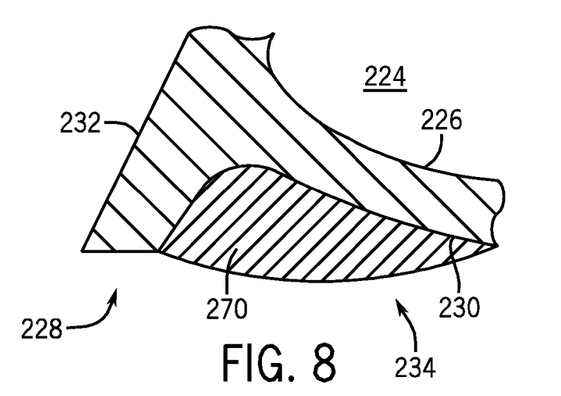
FIG. 8 is a partial cross-sectional view of an embodiment of the injector tip of FIG. 4 with a sacrificial or filling material.

FIG. 8 is a partial cross-sectional view of an embodiment of the injector tip portion 228 with a filler material 270. As illustrated, the filler material 270 fills the recess 234 by attaching to the exterior surface 230. In some embodiments, the filler material 270 may be a sacrificial material exhibiting low fusion characteristics and have a melting point of 50-150 degrees, 60-140 degrees, 75-125 degrees, or another range less than the melting point of the material in tip portion 228. Because the sacrificial material 270 has a lower melting point, it may melt away during gasification operations. As the sacrificial material 270 melts, it reduces the temperature of the injector tip portion 226. Thus, in operation, the sacrificial material 270 draws away energy as it melts away. After the sacrificial material 270 melts away, the recess 234 may continue reducing the thermal stress by lowering the temperature differences between the surfaces, as discussed above. In some embodiments, the filler material 270 may be, for example, a ceramic material that does not melt away, but instead has a high heat resistance (i.e., resists heat transfer). The filler material 270 may then limit heat transfer between the gasification operations and injection tip 228, thereby protecting the injection tip portion 228 from the thermal stress discussed above.

Figure 9:
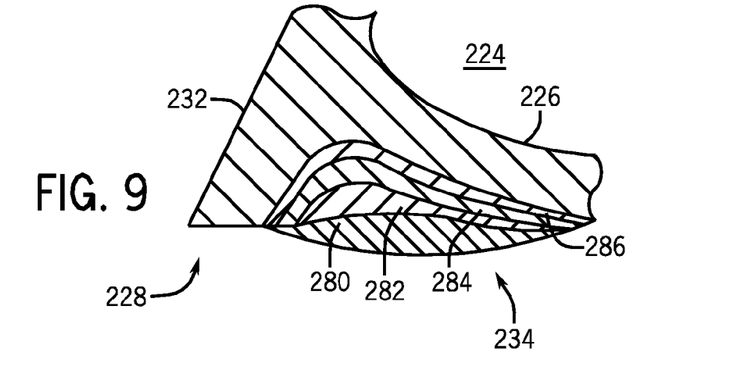
FIG. 9 is a partial cross-sectional view of an embodiment of the injector tip of FIG. 4 with multiple layers of sacrificial or filling material.

FIG. 9 is a partial cross-sectional view of an embodiment of the injector tip portion 228 with multiple layers of filler material 280, 282, 284, and 286. As illustrated, the layers fill the recess 234. While FIG. 9 illustrates four layers, more or less layers are possible, e.g., 1, 2, 3, 4, 5, 6, 7, 8, 9, 10, or more layers. These layers may be sacrificial in nature, i.e., the layers may melt away during gasification operations removing energy from the tip portion 228 or the layers may be heat resistant layers such as ceramics. If the layers are sacrificial in nature, each of the layers may melt away at a different temperature. For example, the layer 280 may have the lowest melting point, whereas the remaining layers have progressively higher melting points, with layer 286 having the highest melting point. By further example, the layers 280, 282, 284, and 286 may have progressively higher melting points, e.g., increasing by 1 to 500, 10 to 100, or 10 to 50 percent per layer. The melting points may change in equal, decreasing, or increasing increments in the layers 280, 282, 284, and 286. If the layers are heat resistant (i.e., ceramic), then the different layers may exhibit different heat resistance values. Again, the heat resistance values may increase by approximately 1 to 500, 10 to 100, or 10 to 50 percent from one layer to another. For instance, the outermost layer 280 may be the most heat resistant with the other layers acting as bonding layers. In other embodiments, the different layers may exhibit different properties (e.g., hardness, toughness, impact resistance, chemical resistance, or heat resistance) and have various thicknesses. For example, the layers may include any combination of sacrificial layers, insulative layers, chemical resistant layers, impact resistant layers, and so forth.

Figure 10:
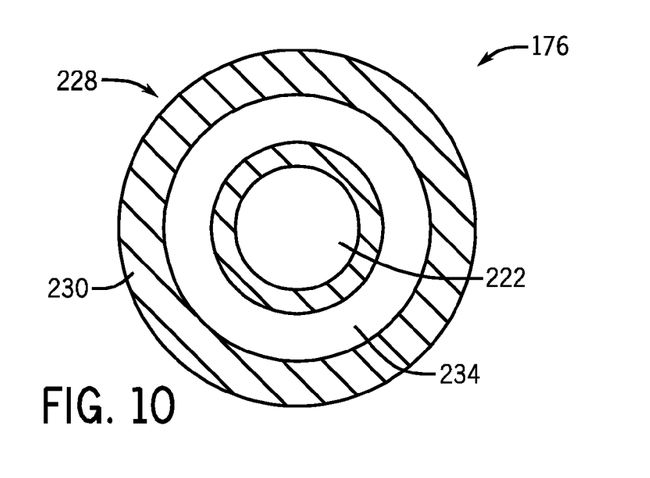
FIG. 10 is a bottom view of an embodiment of the injector tip of FIG. 3 taken along line 10-10.

FIG. 10 is a bottom view of an embodiment of the annular tip portion 228 taken along line 10-10 of FIG. 3. As discussed above, the annular tip portion 228 includes the exterior face 230 with the annular recess 234. The annular tip portion 228 surrounds the aperture 222 through which the fuel 174 and oxygen 172 flow. In the illustrated embodiment, the annular recess 234 is a continuous groove encircling the aperture 222.

Figure 11:
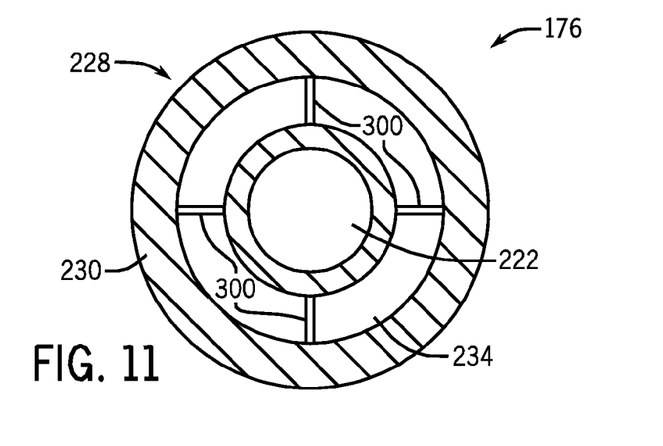
FIG. 11 is a bottom view of an embodiment of the injector tip of FIG. 3 taken along line 10-10, illustrating flanges.

FIG. 11 is a bottom view of an embodiment of the annular tip portion 228 taken along line 10-10 of FIG. 3. Similar to the discussion in FIG. 10, the annular tip portion 228 includes the exterior face 230 with the annular recess 234. The annular tip portion 228 surrounds the aperture 222 through which the fuel 174 and oxygen 172 flow. In the illustrated embodiment, the annular recess 234 is a non-continuous groove encircling the aperture 222, rather than a continuous groove as illustrated in FIG. 10. Thus, the annular recess 234 includes a series of structures 300 (e.g., ribs or flanges) are placed in the annular recess 232. While four structures 300 are illustrated, more or less structures are possible. For example, the annular recess may include 1, 2, 3, 4, 5, 6, 7, 8, 9, 10, or more structures 300. The structures 300 extend radially across the annular recess 234, and may provide structural support in the annular tip portion 228.

Technical effects of the disclosed embodiments include the ability to reduce thermal stress in an injector tip to reduce injector tip failure. A reduction in the thermal stress may be achieved by forming an annular recess in an injector tip portion to control the wall thickness between an oxygen flow and a coolant chamber. The reduction in wall thickness may improve the oxygen flow and coolant's ability to reduce thermal stress in the tip portion by limiting the temperature differences between the different surfaces. The reduction in thermal stress prevents premature or accelerated cracking of the injector tip portion, thus, preserving the injector's life.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gasification fuel injector, comprising:
   a fuel passage configured to inject a fuel;
   a first oxygen passage configured to inject oxygen;
   a tip portion disposed about a central axis, the fuel passage, and the first oxygen passage, wherein the tip portion is disposed downstream from an upstream side of the gasification fuel injector relative to flows of the fuel and the oxygen through the fuel passage and the first oxygen passage, respectively;
   a coolant chamber disposed in the tip portion; and
   a curved recess disposed downstream of the coolant chamber along an exterior surface of the tip portion adjacent an outlet of the gasification fuel injector, wherein the curved recess has a curved cross-section disposed circumferentially around the central axis and a first portion of the exterior surface of the tip portion, a second portion of the exterior surface of the tip portion is disposed circumferentially around the central axis and the curved recess, and the curved cross-section of the curved recess is recessed relative to both the first and second portions of the exterior surface in an axial upstream direction relative to the central axis.

2. The system of claim 1, comprising a gasifier having the gasification fuel injector.

3. The system of claim 1, wherein the curved cross-section comprises a U-shape disposed circumferentially around the central axis and the first portion of the exterior surface of the tip portion, and the U-shape of the curved recess is recessed relative to both the first and second portions of the exterior surface in the axial upstream direction relative to the central axis.

4. The system of claim 1, comprising a sacrificial material disposed in the curved recess.

5. The system of claim 4, wherein the sacrificial material comprises a plurality of sacrificial layers.

6. The system of claim 1, wherein the curved recess is configured to offset a maximum thermal stress point of a thermal stress distribution from a maximum mechanical stress point of a mechanical stress distribution in the tip portion.

7. The system of claim 1, wherein the tip portion comprises a wall between the curved recess and the coolant chamber, and wherein the wall decreases in thickness from a maximum thermal stress point to a maximum mechanical stress point in the tip portion.

8. The system of claim 1, comprising a second oxygen passage and a coolant supply pipe, wherein the coolant supply pipe coaxially surrounds the second oxygen passage.

9. The system of claim 1, wherein the curved cross-section of the curved recess comprises first and second side walls that radially oppose one another relative to the central axis, the first and second side walls of the curved cross-section extend circumferentially around the central axis and the first portion of the exterior surface of the tip portion, the first side wall is recessed relative to the first portion of the exterior surface in the axial upstream direction relative to the central axis, and the second side wall is recessed relative to the second portion of the exterior surface in the axial upstream direction relative to the central axis.

10. The system of claim 1, comprising a plurality of structures extending across the curved recess.

11. The system of claim 1, wherein the curved cross-section has a wavy curvature between the first and second portions of the exterior surface of the tip portion.

12. The system of claim 1, wherein the tip portion comprises a first wall thickness between the curved recess and the coolant chamber and a second wall thickness between the curved recess and the outlet, wherein the first wall thickness is greater than the second wall thickness.

13. The system of claim 1, wherein the tip portion comprises a first wall thickness between the curved recess and the coolant chamber and a second wall thickness between the curved recess and the outlet, wherein the first wall thickness is lesser than the second wall thickness.

14. The system of claim 1, wherein the tip portion comprises a first wall thickness between the curved recess and the coolant chamber and a second wall thickness between the curved recess and the outlet, wherein the first wall thickness is substantially equal to the second wall thickness.

15. The system of claim 1, wherein the curved recess comprises a substantially annular curved recess.

16. The system of claim 1, wherein the curved cross-section of the curved recess is recessed in the axial upstream direction to a first depth relative to the first portion of the exterior surface and a second depth relative to the second portion of the exterior surface.

17. The system of claim 1, wherein the fuel passage and the first oxygen passage are coaxial or concentric with one another.

18. The system of claim 1, wherein the first oxygen passage is configured to inject the oxygen as a pure oxygen, an oxygen mixture, or air.

* * * * *